UNITED STATES PATENT OFFICE.

JOSEPH KLOTZBUECHER, OF DENVER, COLORADO.

PACKING COMPOUND.

No. 916,719.　　　Specification of Letters Patent.　　　Patented March 30, 1909.

Application filed December 4, 1908. Serial No. 465,999.

*To all whom it may concern:*

Be it known that I, JOSEPH KLOTZBUECHER, a subject of Wilhelm the Second, Emperor of Germany, residing at Denver, in the county of Denver and State of Colorado, have invented certain new and useful Improvements in Packing Compounds, of which the following is a specification.

This invention relates to a packing compound for use on flanges, manholes, cylinder covers and other parts of a machine where an impervious joint is required and its object is to provide a plastic substance which, when applied will under the highest pressure or temperature retain its elasticity and power of resistance.

My composition consists of the following ingredients combined in the proportions stated viz:—

| | |
|---|---|
| Manganese dioxid | 77 parts. |
| Linseed oil | 18 parts. |
| Red lead | 3 parts. |
| Graphite | 2 parts. |

These ingredients are to be thoroughly mixed by agitation.

In using the composition it may be applied in various manners, subject to the character, shape and proportions of the parts to be packed. For example, when applied to flanges, manholes or cylinder covers, the compound is rolled between the palms of the hands until it assumes the form of a string or cord to be used in association with metal netting, hemp or similar materials substantially in the same way as red lead is at present employed; for high pressure packing the composition is applied between two sheets of fine metal netting; for box packing it is cut into strips and placed alternately with layers of hemp; and for parts that are frequently separated or removed the packing surface is provided with a thin layer of graphite or talc before the compound is applied.

The composition, if kept in a cool place, is at all times ready for use and if it has become hard, may be softened at once by placing it for a few minutes in hot water or by kneading or beating it after a few drops of linseed oil have been added.

What I claim and desire to secure by Letters Patent is:—

1. The herein described composition of matter consisting of manganese dioxid, linseed oil, red lead, and graphite.

2. The herein described composition consisting of seventy-seven parts of manganese dioxid, eighteen parts of linseed oil, three parts of red lead and two parts of graphite.

In testimony whereof I have affixed my signature in presence of two witnesses.

JOSEPH KLOTZBUECHER.

Witnesses:
　FRANK NIERE,
　G. J. ROLLANDET.